United States Patent
Morris et al.

(10) Patent No.: US 8,320,767 B2
(45) Date of Patent: Nov. 27, 2012

(54) FREE-SPACE PHOTONIC CONNECTION USING WAVELENGTH DIVISION MULTIPLEXING AND OPTICAL ANTENNA

(75) Inventors: Terrel Morris, Garland, TX (US);
Michael Tan, Menlo Park, CA (US);
Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 643 days.

(21) Appl. No.: 12/263,407

(22) Filed: Oct. 31, 2008

(65) Prior Publication Data
US 2009/0274467 A1    Nov. 5, 2009

Related U.S. Application Data

(60) Provisional application No. 61/125,919, filed on Apr. 30, 2008.

(51) Int. Cl.
*H04B 10/00* (2006.01)
*H04B 10/06* (2006.01)

(52) U.S. Cl. ........ 398/130; 398/118; 398/131; 398/103; 398/212; 398/214

(58) Field of Classification Search .................... 398/34, 398/103, 118–120, 126–131, 140; 359/15; 385/12–15, 146; 250/237, 237 G, 201.5
See application file for complete search history.

(56) References Cited

U.S. PATENT DOCUMENTS

| | | | | |
|---|---|---|---|---|
| 4,672,187 A * | 6/1987 | Fujita et al. | | 250/201.5 |
| 4,707,061 A * | 11/1987 | McMahon | | 385/24 |
| 4,850,044 A * | 7/1989 | Block et al. | | 398/118 |
| 6,452,700 B1 * | 9/2002 | Mays, Jr. | | 359/15 |
| 7,039,265 B2 * | 5/2006 | Levy et al. | | 385/14 |
| 7,228,016 B2 * | 6/2007 | Beausoleil | | 385/12 |
| 7,847,236 B2 * | 12/2010 | Bratkovski et al. | | 250/237 G |
| 2003/0039008 A1 * | 2/2003 | Davies | | 359/130 |
| 2003/0123877 A1 * | 7/2003 | Lo | | 398/34 |
| 2004/0264910 A1 * | 12/2004 | Suzuki et al. | | 385/146 |
| 2005/0147417 A1 * | 7/2005 | Prather et al. | | 398/183 |
| 2007/0223859 A1 * | 9/2007 | Kornilovich et al. | | 385/15 |
| 2008/0013878 A1 * | 1/2008 | Fujiwara et al. | | 385/12 |

OTHER PUBLICATIONS

Alda et al: "Optical Antennas for Nano-Photonic Applications", Nanotechnology, 16 (2005), pp. S230-S234.*
Qian et al: "A Microtrip Patch Antenna using Novel Photonic Band-Gap Structures", Microstrip Journal, Jan. 1999, pp. 1-3.*

* cited by examiner

Primary Examiner — Li Liu

(57) ABSTRACT

An interconnect system has an optical transmitter mounted on a first circuit board and an optical receiver mounted on a second circuit board. The optical receiver can be nominally aligned to receive an optical signal through free space from the optical transmitter. Further, the optical receiver includes one or more light detectors, and an optical antenna coupled to direct incident light into the one or more light detectors.

19 Claims, 4 Drawing Sheets

FREE-SPACE PHOTONIC CONNECTION USING WAVELENGTH DIVISION MULTIPLEXING AND OPTICAL ANTENNA

CROSS-REFERENCE TO RELATED APPLICATION

The present application claims priority from provisional application Ser. No. 61/125,919, filed Apr. 30, 2008, the contents of which are incorporated herein by reference in their entirety.

BACKGROUND

High data rate signal transmission is a concern in many systems. Current server systems, for example, often use a set of rack mounted components or user-selected blades that work together to provide data storage, processing, and communications, and the individual components often need to communicate with each other at high data rates to provide the desired system performance. In a server system using blades, the blades, e.g., server blades and storage blades, are mounted in a common enclosure and share components such as cooling fans, power supplies, and enclosure management. In general, data signals transmitted among the blades must collectively provide high data rate transmissions. With current technology, each data signal may have a bandwidth of about 10 Gbit/s or more, and several parallel data signals may be required to provide the desired data flow rate.

Electrical signals generally oscillate at high frequencies to provide high data transmission rates, and the high frequency oscillations can present impedance and noise problems for electrical signals transmitted over copper wires or traces. Optical signaling can avoid many of these problems, but optical signaling may still require complex waveguide systems for dealing with loose optical cables or ribbons that must be connected or disconnected when components are installed or removed. Free-space optical signaling avoids the use of complex systems of optical fibers or waveguides but must address alignment issues. In particular, optical signaling generally requires circuits for conversion between optical and electrical signals, and a receiver converting a high data rate optical signal to an electrical signal for an electronic component generally requires a small-area, low-capacitance photodiode because of the high frequency of the electrical signal. Directing a free-space optical signal onto the small area of the photodiode generally requires use of precise alignment systems that in many applications must be able to adjust or adapt to relative system movements or vibrations. Methods and systems for transmitting high data rate signals that avoid the problems associated with wires and optical fibers or waveguides and that simplify component alignment are sought.

SUMMARY

In accordance with an aspect of the invention, a system including a first circuit board and a second circuit board has an optical transmitter mounted on the first circuit board and an optical receiver mounted on the second circuit board. The optical receiver can be nominally aligned to receive an optical signal through free space from the optical transmitter. The optical receiver includes one or more light detectors, and an optical antenna coupled to direct incident light into the one or more light detectors. The area of the optical antenna can be larger than the area of the light detectors to better tolerate misalignment of the first and second circuit boards.

BRIEF DESCRIPTION OF THE DRAWINGS

Use of the same reference symbols in different figures indicates similar or identical items.

DETAILED DESCRIPTION

In accordance with an aspect of the invention, a receiver in a high bandwidth data channel can employ a semiconductor optical antenna having a large area capable of receiving a free-space optical signal. A photodiode or other light detector can be positioned to receive the optical signal from the optical antenna. The capacitance of the detector can be kept small for efficient conversion to high frequency electronic signals. In contrast, the area of the optical antenna can be sufficiently large to provide tolerance for misalignment and expected movement of the optical signal as a result of relative misalignment and movement of a transmitter and the detector. Further, the free-space optical signal can be a wavelength division multiplexed (WDM) signal, and multiple resonators can be positioned to extract different wavelength components from the optical antenna. Multiple light detectors can then convert the separate wavelength components into parallel electrical signals.

Figure 1:
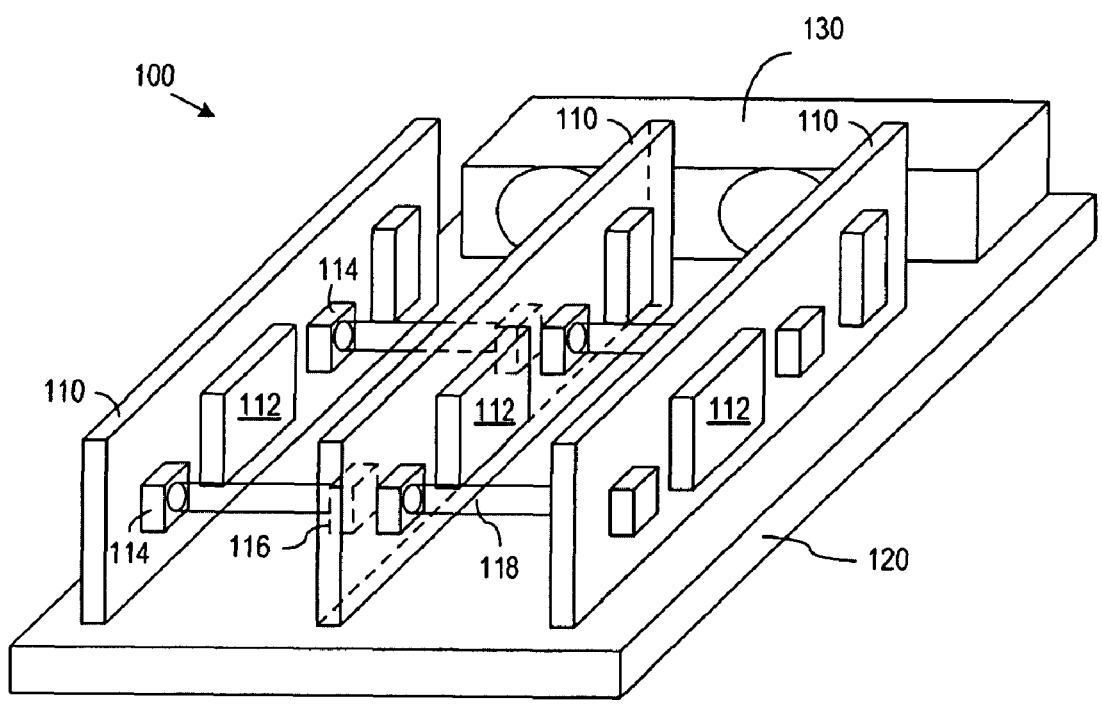
FIG. 1 shows a perspective view of a server system employing free-space photonic communication in accordance with an embodiment of the invention.

FIG. 1 illustrates a server system 100, which is one example where a free-space optical data channel in accordance with an embodiment of the invention can be used. Server system 100 includes a set of blades 110 that are mounted on a server chassis 120. Additional components 130 such as power supply transformers and cooling fans can also be connected to chassis 120, and the entire assembly would typically be contained in a shared enclosure (not shown). A user interface and sockets for external connections to server system 100 may be provided through the shared enclosure.

Some or all of blades 110 in system 100 may be substantially identical or of differing designs to perform different functions. For example, some blades 110 may be server blades or storage blades. Each blade 110 includes one or more electrical subsystems 112 that implement the particular functions of the blade 110. Subsystems 112 may be mounted on either one or both sides of each blade 110 in the manner of components on a printed circuit board, or blades 110 may include enclosures with subsystems 112 in the interior of the blade 110. Typical examples of such subsystems 112 include hard drives or other data storage and processor subsystems containing conventional computer components such as microprocessors, memory sockets, and integrated circuit memory. Subsystems 112 and the general features of blades 120 may be of conventional types known for server systems using blade architectures, such as the c-class architecture of server systems commercially available from Hewlett-Packard Company.

Each blade 110 additionally includes one or more optical transmitters 114 and/or one or more optical receivers 116. Each transmitter 114 is positioned on a blade 110 to be nominally aligned with a corresponding receiver 116 on a neighboring blade 110 when the blades 110 are properly mounted on chassis 120. Transmitters 114 produce optical signals 118 that can therefore be transmitted through free space to the corresponding receivers 116. In a typical configuration for server system 100, there may be about 5 cm of free space between a transmitter 114 and the corresponding receiver 116. After traversing the free space between blades 110, WDM signal beam 118 will have a beam diameter that depends on the beam source in transmitter 114, collimating optics associated with transmitter 114, and collecting optics associated with receiver 116. Generally speaking, WDM beam diameters are carefully controlled to work with single-mode fibers with a core diameter of 8 to 10 μm. Signal beam 118 is ideally incident at a target point on the receiver 116. However, signal beam 118 in general will be at a location offset from the target point as a result of relative misalignment of the transmitter 114 and the corresponding receiver 116. A misalignment distance on the order of about 500 to 1000 μm is typical for variations in the mechanical mounting of blades 110 using current technology. Additionally, the alignment of a transmitter-receiver pair may be subject to time-varying misalignment on the order of 40 to 50 μm due to temperature variations and/or mechanical vibrations, for example, from the operation of cooling fans in server system 100.

Each receiver 116 generally includes one or more photodiodes or other optical detectors with each detector having a light sensitive area of a size selected according to the data rate or frequency of an electrical signal produced by the detector. For a data rate of 10 Gbits/s or more, the width of light sensitive area generally needs to be less than about 40 μm across. Receiver 116 can be made tolerant of misalignment using an optical antenna that has a diameter on the order of up to about 1 mm. The optical antenna provides a large area for collection of optical signal 118 and also serves to direct the received signal to the light detector or detectors in receiver 118.

Figure 2:
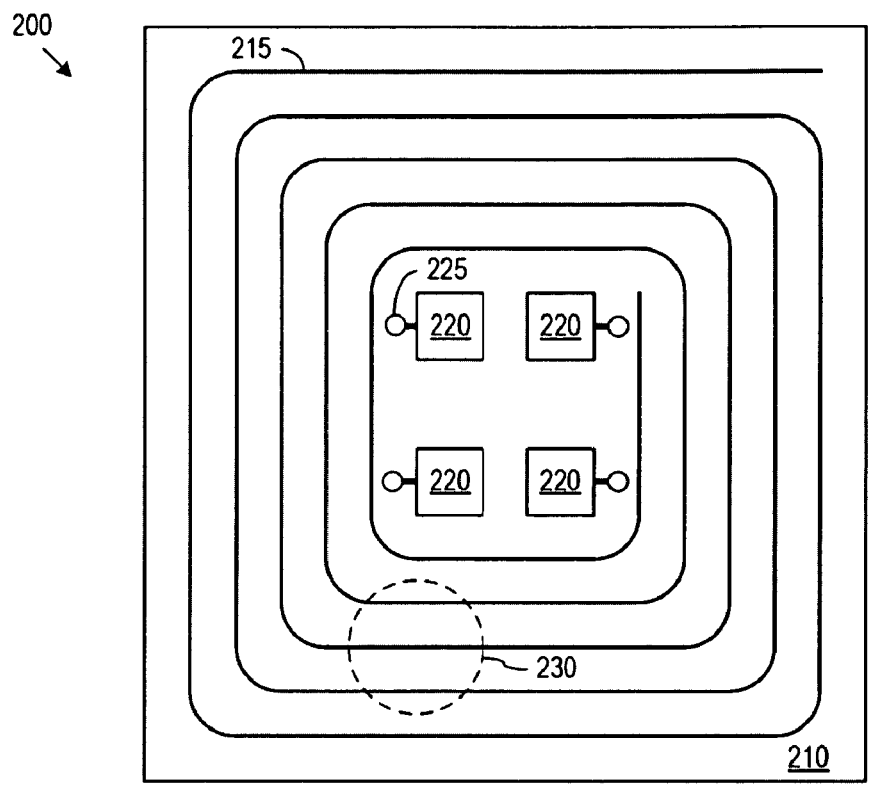
FIG. 2 shows a plan view of a detector in accordance with an embodiment of the invention using a coiled waveguide as an optical antenna.

FIG. 2 schematically illustrates a plan view of a receiver 200 in accordance with an embodiment of the invention. Receiver 200 includes an optical antenna 210 and multiple photodiodes 220. Optical antenna 210 is a structure that can be fabricated in a semiconductor die with photodiodes 220 and serves to collect light from an incident beam and direct the collected light to photodiodes 220. In one specific embodiment, optical antenna 210 includes a semiconductor waveguide 215 having a coiled path that densely covers the area of optical antenna 210. Accordingly, a cross-section of an incident WDM signal beam 230 will overlap one or more sections of waveguides 215. In this embodiment, light from beam 230 can be coupled into waveguide 215 by scattering, diffraction, or other interference effects, and if desired, a structure such as a grating overlying waveguide 215 can be added to enhance the coupling efficiency of beam 230 into waveguide 215 over the range of frequencies used in WDM signal 230.

Such photonic structures can be fabricated in silicon or other material using techniques known in the art. In particular, waveguide 215 can be formed using conventional lithographic techniques to create a coiled channel that is surrounded by materials of lower refractive index, so that light coupled into waveguides 215 is guided. Alternatively, waveguide structures can be created using photonic crystals, which can be formed as a periodic pattern in a substrate that are removed or treated to change the refractive index of the pattern relative to the remainder of the substrate. Photonic crystals are known in the an to have interference effects that can create waveguides in which selected wavelengths or modes of light can propagate or reside and also create resonators capable of extract specific wavelengths of light from the waveguides. Joannopoulos et al., "Photonic Crystals: Molding the Flow of Light," 2nd Edition, Princeton N.J.: Princeton University Press (2008) further describes known photonic crystal structures and techniques for their implementation.

Each light detector 220 is used to measure a different frequency component of the light that optical antenna 210 collects. Detectors 220 are positioned along the length of waveguide 215. FIG. 2 shows detectors 220 as being in a center region of waveguide 210, but detectors 220 may be better placed outside the area in which WDM signal 230 may be incident, so that optical antenna 210 can evenly cover an entire target area for WDM signal 230. In one embodiment, each detector 220 has an associated resonator 225 positioned to act as a tap filter that extracts from waveguide 215 a particular wavelength of light that the corresponding detector 220 converts to an electrical signal. Resonators 225 reside in the evanescent field adjacent waveguide 215 and may have different sizes with the sizes corresponding to the wavelengths desired to be removed from waveguide 215. Such resonators 225 may be implemented with conventional waveguides or as defects in the photonic crystal created in the same process that forms optical antenna 220. Alternatively, an array waveguide grating could be integrated in the semiconductor structure, e.g. below waveguide 215 or in series with waveguide 215, to separate frequency components and direct the separated frequency components into respective detectors 220.

In an exemplary embodiment of the invention, detectors 220 and optical antenna 210 are integrated in the same semiconductor die using CMOS processing techniques. However, optical antenna 210 may alternatively be a separate component that receives and directs an optical signal into a separate WDM detector. With a separate optical antenna, the WDM detector can use any desired technique for generating separate signals from different wavelength components including but not limited to use of resonators 225 or other integrated circuit structures to extract desired wavelength components.

Light detectors 220 can be conventional PN or PIN photodiodes, which are well known in the art. Detectors 220 include photoelectric areas that are as small as necessary to handle high frequency modulation of the frequency components in optical signals 230. In the same structure, the area of optical antenna 210 can be made as large as necessary to accommodate variations in misalignment of detector 200 with an optical transmitter. In one exemplary embodiment, antenna 210 may be on the order of 1 cm or more across to provide a relatively large tolerance for misalignment, while the photoelectric area of each detector 220 is less than about 40 μm across for data rates above about 5 Gb/s per frequency channel of the WDM signal.

Figure 3:
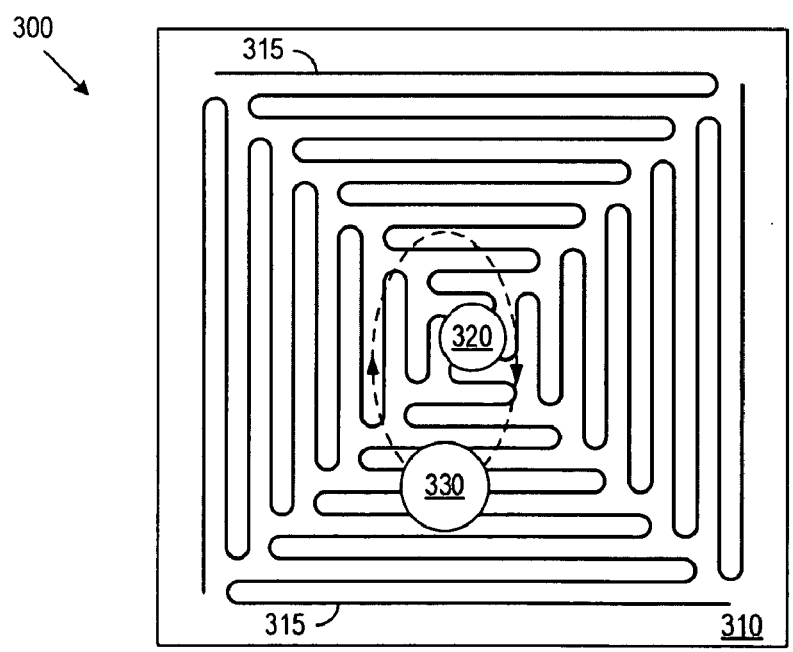
FIG. 3 shows a plan view of a detector in accordance with an embodiment of the invention using multiple coiled waveguides as an optical antenna.

FIG. 3 shows a WDM detector 300 using an optical antenna 310 including multiple coiled waveguides 315 that direct light collected from an optical signal 330 into light detectors 320. Waveguides 315 can all feed into a single waveguide (not shown) from which light detectors 320 extract respective frequency components of WDM signal 330. In particular, light detectors 320 can include resonators in the evanescent field of the combined waveguide to extract respective frequency components of the collected light and multiple photodiodes sized for conversion of frequency component signals into high frequency electrical signals. Optical antenna 310 and light detectors 320 can be fabricated in the same semiconductor substrate/structure also as described above.

FIG. 3 also illustrates how vibrations or other movement of detector 300 relative to a transmitter of free space WDM optical signal 330 can cause the incident area of optical signal 330 on detector 300 to move. The range of movement in general can be much larger than the area of light detectors 320. However, through the range of movement shown, WDM signal 330 remains incident on at least one of waveguides 315 so that light from signal 330 is continuously coupled into waveguides 315 and measured by light detectors 320.

Figure 4:
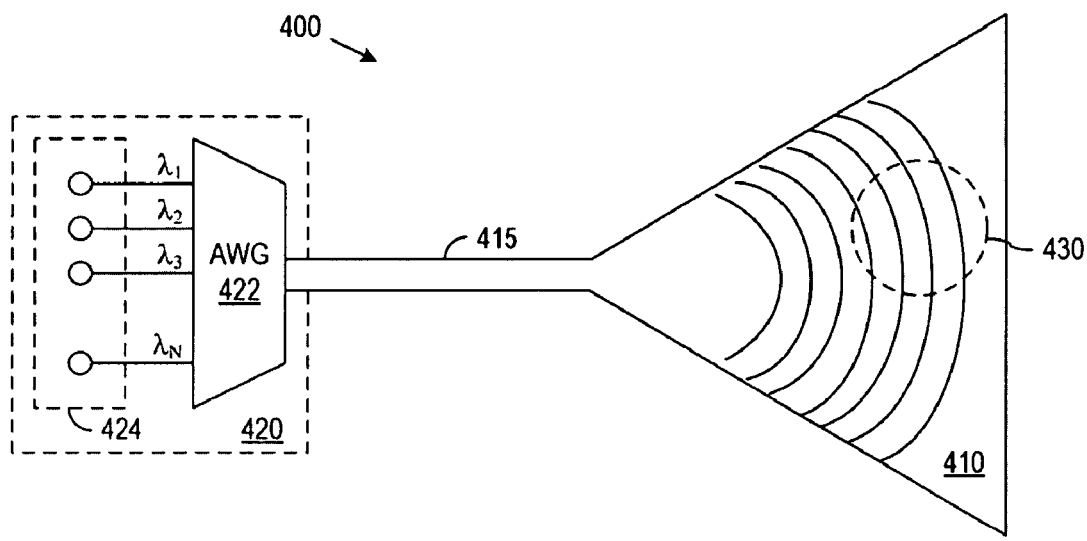
FIG. 4 shows a plan view of a detector in accordance with an embodiment of the invention using a grating in an optical antenna.

FIG. 4 shows a detector system 400 using a grating as an optical antenna 410 that couples a WDM signal 430 into a high speed waveguide detector 420. In an exemplary embodiment, the grating is s a circular second order grating that is tapered to better diffract or otherwise direct light into a single mode waveguide 415 that feeds light into detector 420. Since WDM signal 430 contains multiple frequencies, the grating in optical antenna 410 could be chirped to produce a wider range of wavelength acceptance. Alternatively, a holographic lens or other diffractive structure could be used. Wave guide 415 can be a slab waveguide that is fabricated in the same semiconductor structure as optical antenna 410, and the taper grating helps gather light into 415. Waveguide detector 420 is coupled to waveguide 415 and serves to separate and measure the frequency components of a WDM signal 430. In the illustrated embodiment, detector 420 includes an arrayed waveguide grating to separate frequency components of the WDM signal, and photodiodes 424 to separately measure the frequency components. As discussed above, waveguide detector 420 can include small area photodiodes 424 to provide low capacitance and high speed operation for high data rate signals. Such structures can be fabricated in semiconductor substrate with waveguide 415 and light detectors 420 using conventional techniques.

Figure 5:
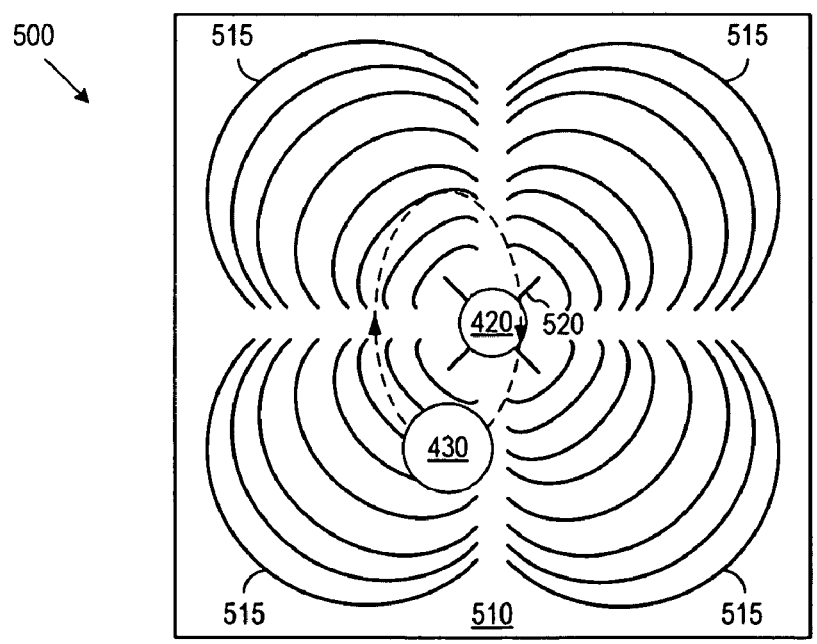
FIG. 5 shows a plan view of a detector in accordance with an embodiment of the invention using multiple gratings or holographic lenses as an optical antenna.

FIG. 5 shows an embodiment of a WDM detector 500 using an optical antenna 510 that includes multiple gratings or holographic lenses 515. Gratings 515 direct incident light from WDM signal 430 into a waveguide 520 that leads to detector 420. Detector 500 includes multiple grating or holographic lenses 515 to provide a large area target for a free space WDM signal 430. As illustrated, motion of detector 500 relative to a transmitter of free space WDM signal 430 can cause the incidence area of WDM optical signal 430 to shift from one grating or holographic lens 515 to another. However, the light from optical signal 430 is continuously collected and fed to waveguide 520 for measurement or conversion of the separate frequency components of free space WDM optical signal 430.

Figure 6:
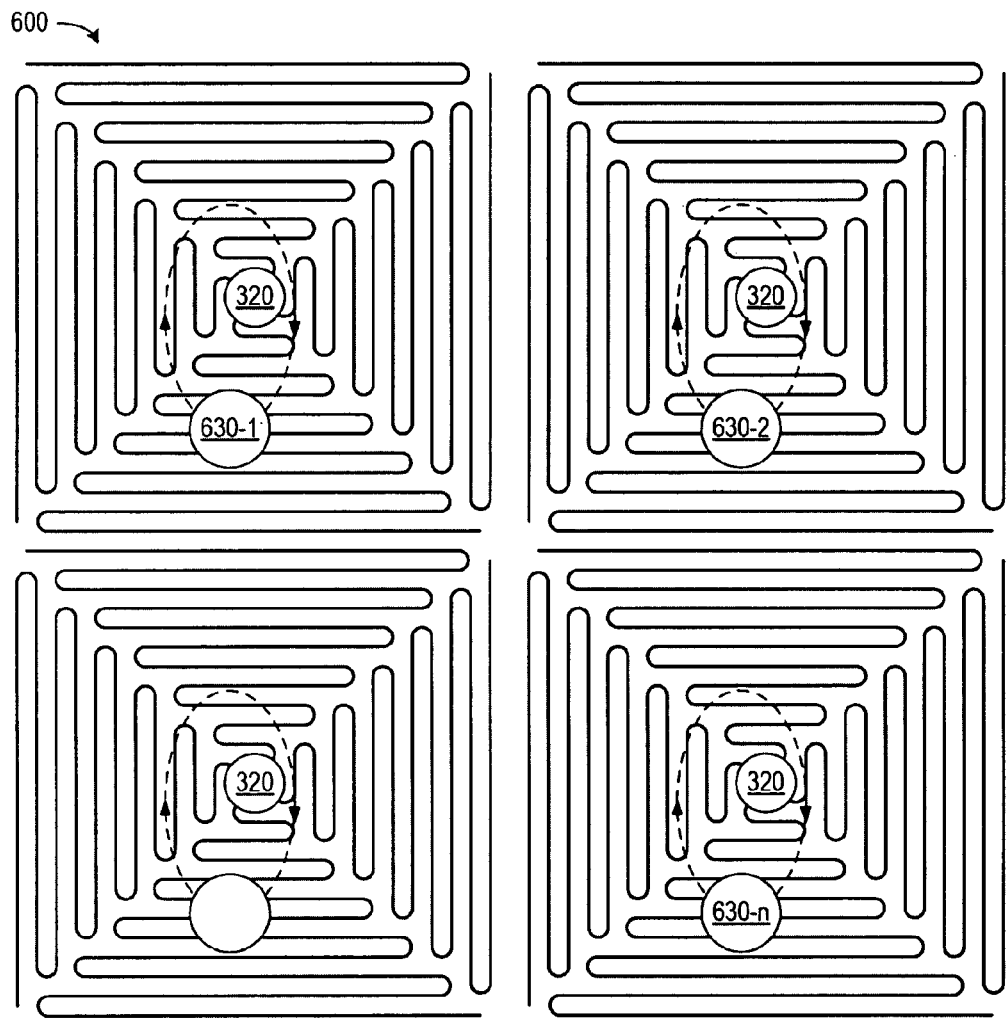
FIG. 6 shows a WDM detector system using parallel CWDM signals and multiple WDM detectors with separate optical antennas.

FIG. 6 shows a detector system 600 that can be used with multiple free space WDM optical signals 630-1 to 630-$n$. Detector system 600 includes one WDM detector for each of optical signals 630-1 to 630-$n$, and the individual WDM detectors can be of any of the types described above with regards to FIGS. 2, 3, 4, and 5. With multiple parallel free space WDM optical signals, a high data rate can be achieved even when each of the optical signals uses coarse wavelength division multiplexing (CWDM). CWDM has the advantage of using fewer frequency components. The small number of frequency components can be spread across a narrow spectrum of light, so that the optical antennas coupling of optical signals 630-1 to 630-$n$ into the waveguides that feed light detectors 320 may not be required to accept a broad frequency range. Alternatively, the frequency components in a CWDM signal can be spaced widely, which permits use of less expensive components to produce the CWDM signal and to separate frequency components for measurement.

Figure 7:
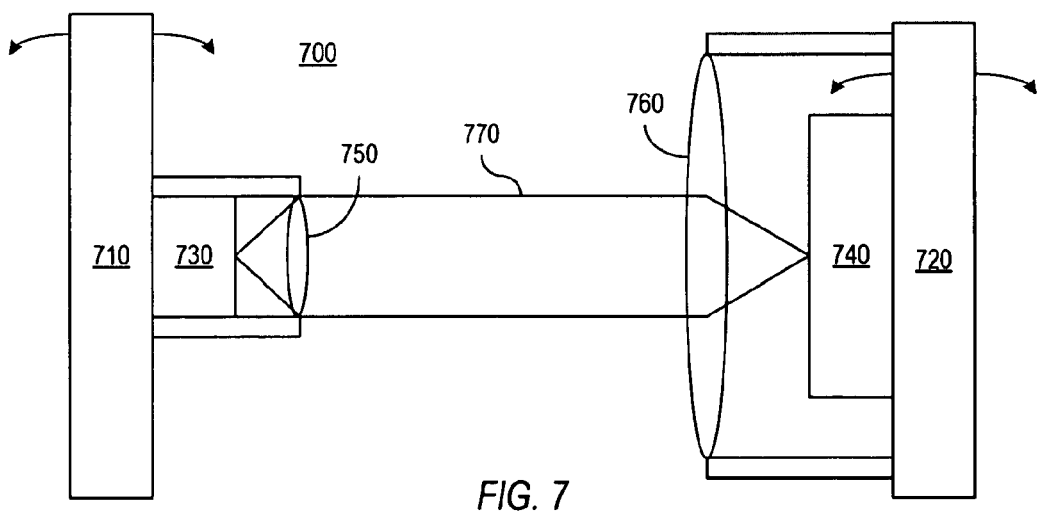
FIG. 7 illustrates a data channel in accordance with an embodiment of the invention.

FIG. 7 illustrates a system 700 implementing a free-space WDM optical data channel in accordance with an embodiment of the invention. System 700 includes a pair of electrical circuit boards 710 and 720 that are substantially parallel to each other and separated from each other by about 2 to 5 cm. Circuit boards 710 and 720 may be server blades as illustrated in FIG. 1 or any other electrical devices capable of communicating at a high data rate. Boards 710 and 720 may be plugged into a shared chassis sot that boards 710 and 720 are substantially parallel to each other. A WDM transmitter 730 is mounted on board 710 and transmits a WDM optical signal 770 through free space toward a receiver 740 mounted on board 720.

WDM transmitter 730 can be of a conventional design and may, for example, include multiple light sources such as light emitting diodes (LEDs) or semiconductor lasers, e.g., VCSELs, that produce separate monochromatic beams having different wavelengths. Each beam can be independently modulated, for example, through modulation of the drive currents of the light sources. The separately modulated beams represent parallel data streams but can be combined into a single WDM signal beam, for example, using fiber couplers or other optical elements. Alternatively, a WDM transmitter could employ a single broadband laser source and multiple modulators capable of modulating multiple frequencies in a single beam.

Receiver 740 can be of the type described above with reference to FIG. 2, 3, or 4. In an exemplary embodiment, receiver 740 includes multiple photodiodes that are coupled to receive light from an optical antenna having an area that is much larger than the photoactive areas of the photodiodes. The photodiodes can be in one-to-one correspondence with the wavelengths used in WDM optical signal 770 and respectively decode the parallel data streams that transmitter 730 encoded in WDM optical signal 770.

System 700 contains optics including a collimating lens 750 mounted on board 710 and a collecting lens 760 mounted on board 740. In ideal alignment as shown in FIG. 7, collecting lens 760 receives WDM optical signal 770 as a collimated beam and focuses the beam at a target point on receiver 740. However, boards 710 and 720 in system 700 are generally subject to misalignment and motion that can cause WDM optical signal 770 to miss the target point. The misalignment may include shifts and tilting of circuit board 720 relative to circuit board 710. As illustrated, collecting lens 760 can be made large to tolerate relative shifting of boards 710 and 720. In particular, if lens 750 collimates beam 770 so that beam 770 is entirely along the optical axis of lens 760, lens 760 will focus beam 770 at a focal point, and lens 760 can be mounted on board 760 so that the focal point coincides with the target point on receiver 740. In such a case, collecting lens 760 will focus a shifted beam 770 on the target point as long as the shifted beam is parallel to the optical axis and incident on lens 760. However, relative tilting of boards 710 and 720 will cause focused beam 770 to move away from the target point on receiver 740. System 700 could employ other static optical systems for beam focusing, but in general, a static optical system is unable to keep a signal beam precisely focused on the target point when subjected to shifts and tilting. A co-owned PCT App. No. US2008/014437, entitled "Free Space Optical Interconnect" describes an adaptive optical system using servos or other mechanisms to move optical elements for steering a signal beam on to the target point.

Receiver 740 in accordance with the present invention provides an optical antenna that effectively extends the target area for beam 770. As a result, beam 770 is not required to be incident on the photoactive area of the light detectors in receiver 740 but instead is adequately aligned if beam 770 is incident anywhere on the optical antenna. This relaxation of alignment/targeting requirements can be beneficially employed in a data channel employing a static optical system as illustrated in FIG. 7, a dynamic beam steering system to improve alignment such as described above, or no optical system when the area of the optical antenna is sufficient to cover the full range of expected misalignments. The passive alignment tolerance provided by the optical antenna is particularly useful in situations where vibrations, shock, or other rapid motion may occur at a rate that is too fast to be corrected by a beam steering mechanism. In general, the size of the optical antenna is selected according to the residual amount of alignment variation after correction by the optics and dynamic systems if any.

The use of an optical antenna or large collecting lenses tends to increase the area of board 720 required for a data channel. When multiple optical signals are needed to provide a desired rate of data communication, the larger area can become an issue in some applications. Cross-talk may result if separate optical signals employing the same wavelength are incident at locations closely spaced on a circuit board. However, use of a WDM optical signal allows multiple data channels to share an optical antenna and reduces overhead area per data channel.

Although the invention has been described with reference to particular embodiments, the description is only an example of the invention's application and should not be taken as a limitation. For example, although the above embodiments employ optical systems, such description is not intended to limit the invention to embodiments using visible light. Other wavelengths of electromagnetic radiation such as infrared or ultraviolet light are also suitable for use in the embodiments. Further, although the above description uses the example of a blade server system to illustrate application of aspects of the invention, embodiments of the invention can be employed in other applications, including but not limited to computer systems. Various other adaptations and combinations of features of the embodiments disclosed are within the scope of the invention as defined by the following claims.

What is claimed is:

1. A system comprising:
    a first circuit board with an optical transmitter mounted on the first circuit board;
    a second circuit board with an optical receiver mounted on the second circuit board, where the optical receiver is nominally aligned to receive an optical signal through free space from the optical transmitter, and wherein the optical receiver comprises:
    a light detector; and
    an optical antenna including an optical waveguide having a path that coils through and covers a target area of the optical signal so that light from the optical signal incident on the target area is coupled into the optical waveguide, the optical waveguide further being coupled to direct incident light into the light detector.

2. The system of claim 1, wherein the system comprises a server system and at least one of the first circuit board and the second circuit board is a component of a blade mounted in the server system.

3. The system of claim 1, wherein the optical receiver comprises a plurality of light detectors coupled to receive light from the optical antenna.

4. The system of claim 3, wherein the optical receiver further comprises photonic structures that provide respective optical couplings from the optical antenna to the light detectors, wherein each of the photonic structures extracts light of a different wavelength from the optical antenna.

5. The system of claim 4, wherein each of the photonic structures comprises a resonator.

6. The system of claim 4, wherein the optical antenna comprises a photonic bandgap crystal, and each of the photonic structures comprises a defect in the photonic bandgap crystal.

7. The system of claim 1, wherein the optical antenna comprises a photonic bandgap crystal.

8. The system of claim 1, wherein the optical receiver including the detector and the optical antenna are integrated in a semiconductor die.

9. A receiver system for a free-space optical signal, comprising:
    an optical antenna including an optical waveguide that coils through and covers a target area for receiving a free-space optical signal containing multiple wavelength components, wherein the optical waveguide is arranged in the target area so that incident light from the free-space optical signal is coupled into the optical waveguide; and
    a plurality of light detectors coupled to extract from the optical waveguide of the optical antenna respective wavelength components.

10. The system of claim 9, further comprising photonic structures that provide respective optical couplings from the optical antenna to the light detectors.

11. The system of claim 10, wherein each of the photonic structures comprises a resonator.

12. The system of claim 10, wherein the optical antenna comprises a photonic bandgap crystal in which the optical waveguide resides, and each of the photonic structures comprises a defect in the photonic bandgap crystal.

13. The system of claim 9, wherein the optical waveguide has a coiled path covering the target area for receiving the free-space optical signal.

14. The system of claim 9, wherein the optical antenna and the light detectors are portions of an integrated semiconductor structure.

15. The system of claim 9, further comprising a grating overlying the optical waveguide, the grating being patterned to enhance the coupling efficiency of the free-space optical signal into the optical waveguide.

16. The system of claim 9, wherein the detectors reside outside the target area for the free-space optical signal.

17. The system of claim 9, wherein the incident light from the free-space optical signal is coupled into the optical waveguide by scattering, diffraction, or other interference effects.

18. A receiver system comprising:
    a die;
    an optical waveguide formed in and on the die and having a path that covers a target area so that light from an optical signal incident on the target area is coupled into the optical waveguide;

a plurality of resonators positioned to respectively extract different wavelengths from the waveguide; and a plurality of light detectors formed in and on the die and positioned to respectively convert light from the resonators into respective electrical signals, wherein the die comprises a photonic crystal, and the waveguide and the resonators comprise defects in the photonic crystal.

19. The system of claim 18, wherein the resonators have different sizes with the sizes corresponding to the wavelengths to be extracted from the waveguide.

* * * * *